(12) United States Patent
Kim et al.

(10) Patent No.: US 8,568,672 B2
(45) Date of Patent: Oct. 29, 2013

(54) AGENT FOR DETOXIFYING DISCHARGE GAS CONTAINING VOLATILE INORGANIC HYDRIDE AND METHOD OF DETOXIFYING DISCHARGE GAS CONTAINING VOLATILE INORGANIC HYDRIDE

(75) Inventors: Hyun-Joong Kim, Toyama (JP); Yasushi Shioya, Toyama (JP); Kenichirou Sunata, Toyama (JP)

(73) Assignee: Sued-Chemie Catalysts Japan Inc., Tokyo (JP)

( * ) Notice: Subject to any disclaimer, the term of this patent is extended or adjusted under 35 U.S.C. 154(b) by 0 days.

(21) Appl. No.: 13/260,512

(22) PCT Filed: Mar. 27, 2009

(86) PCT No.: PCT/JP2009/056401
§ 371 (c)(1),
(2), (4) Date: Dec. 27, 2011

(87) PCT Pub. No.: WO2010/109671
PCT Pub. Date: Sep. 30, 2010

(65) Prior Publication Data
US 2012/0107201 A1    May 3, 2012

(51) Int. Cl.
*B01D 53/34* (2006.01)
*B01D 53/64* (2006.01)

(52) U.S. Cl.
USPC ........................................................ 423/210

(58) Field of Classification Search
USPC ........... 423/210; 252/182.32, 182.33, 183.14, 252/183.16
See application file for complete search history.

(56) References Cited

U.S. PATENT DOCUMENTS 5,916,836 A * 6/1999 Toufar et al. .................... 502/86
2003/0181774 A1 * 9/2003 Kong et al. .................... 585/475

FOREIGN PATENT DOCUMENTS

| JP | S62-212217 A | | 9/1987 |
| JP | H05-269339 A | | 10/1993 |
| JP | H06-319945 A | | 11/1994 |
| JP | H08-155259 A | | 6/1996 |
| JP | 08-173759 A | * | 7/1996 |
| JP | H08-192024 A | | 7/1996 |
| JP | H08-318131 A | | 12/1996 |
| JP | 2002-136834 A | | 5/2002 |
| JP | 2003-126647 A | | 5/2003 |
| JP | 2007-21318 A | | 2/2007 |
| JP | 2007-98194 A | | 4/2007 |

* cited by examiner

Primary Examiner — Timothy Vanoy
(74) Attorney, Agent, or Firm — Robert A. Blaha; Smith Risley Tempel Santos LLC

(57) ABSTRACT

A detoxifying agent and a detoxifying method are provided which have a high detoxifying ability in a detoxifying treatment of a discharge gas containing a volatile inorganic hydride and generating in a semiconductor production step. A zeolite is added to a solid metal hydroxide, a solid metal carbonate, a solid basic metal carbonate, or a mixture of these compounds to thereby obtain the detoxifying agent which has the excellent ability to detoxify a discharge gas containing volatile inorganic hydride. The zeolite to be added is a synthetic zeolite selected from zeolite Y, MFI zeolite, mordenite zeolite, beta zeolite, zeolite A, zeolite X, and zeolite L or is a natural zeolite.

5 Claims, No Drawings

AGENT FOR DETOXIFYING DISCHARGE GAS CONTAINING VOLATILE INORGANIC HYDRIDE AND METHOD OF DETOXIFYING DISCHARGE GAS CONTAINING VOLATILE INORGANIC HYDRIDE

TECHNICAL FIELD

The present invention relates to a detoxifying agent of a metal hydride-containing discharge gas and a method of detoxifying the same. Particularly, the present invention relates to a detoxifying agent of a metal hydride-containing discharge gas generated at a semiconductor manufacturing factory, liquid crystal manufacturing factory or the like and a method of detoxifying the same.

BACKGROUND ART

At a semiconductor manufacturing factory, a variety of metal hydride gases and halide gases, such as silane, phosphine and arsine, are used during the semiconductor production. Since these gases are flammable and/or hazardous, from the standpoint of environmental protection, it is not allowed to discharge a waste gas containing such gases into the atmosphere without any treatment; therefore, it is required to perform a treatment in order to eliminate the danger and toxicity of such gases.

For treating such a discharge gas, there are a wet-type processing method and dry-type processing method. The former is a method in which a discharge gas is washed with a chemical solution, and such a wet-type processing method has drawbacks in that, since it uses water and drugs in large amounts, a large amount of wastewater must be treated after the processing, and that the equipments therefor are large and space-occupying. Meanwhile, the latter is a method in which a discharge gas is allowed to flow in a column loaded with a granular solid treatment agent and dangerous and hazardous gases are separated and detoxified by chemical actions between the gases to be detoxified and the treatment agent, that is, by absorption and/or chemical reactions. Such dry-type processing method is widely used in the treatment of a metal hydride-containing discharge gas or halide gas-containing discharge gas.

A number of patents are directed to a treatment agent of a metal hydride-containing discharge gas, and there are disclosed a detoxifying agent composed of a metal oxide (Patent Document 1), detoxifying agents composed of a metal hydroxide, metal carbonate or basic metal carbonate (Patent Documents 2, 3 and 4), detoxifying agents which comprise a metal hydroxide, metal carbonate or basic metal carbonate modified by a basic compound such as an alkaline metal (Patent Documents 5 and 6) and a detoxifying agent which utilizes a zeolite to eliminate phosphine ($PH_3$) present in monosilane ($SiH_4$) in a trace amount (Patent Document 7).

However, although such detoxifying agents composed of a metal hydroxide, metal carbonate or basic metal carbonate have excellent detoxifying capacities, an agent having a higher detoxifying capacity has been demanded due to the increasing usage of special gases in association with recent technological advance. Accordingly, the above-described detoxifying agents no longer have sufficient per-volume discharge gas-treating amount.

In the same manner, the per-volume discharge gas-treating amounts of those detoxifying agents which comprise a metal hydroxide, metal carbonate or basic metal carbonate modified by a basic compound such as an alkaline metal are also not sufficient. In addition, in cases where a detoxifying agent is produced in a large amount at an industrial scale by a method comprising the steps of mixing a powder detoxifying component and an alkaline component and molding the resulting mixture, since a strong alkali is used, there is a safety issue. Furthermore, in order to implement safety measures, there are various problems, for example, in that investments have to be made in a variety of equipments to have a closed system and such, so that the production cost is increased.

Patent Document 1: JP H05-269339A
Patent Document 2: JP H06-319945A
Patent Document 3: JP H08-192024A
Patent Document 4: Japanese Patent No. 2604991
Patent Document 5: JP H08-155259A
Patent Document 6: JP 2002-136834A
Patent Document 7: JP S62-212217A

DISCLOSURE OF THE INVENTION

Problems to be Solved by the Invention

An object of the present invention is to provide a detoxifying agent which exhibits high detoxifying capacity in detoxification treatment of a metal hydride-containing discharge gas generated by a semiconductor production process and a method of detoxifying such gas.

Means for Solving the Problems

In order to solve the above-described problems, the present inventors intensively studied to discover that a detoxifying agent exhibits excellent detoxifying performance against a metal hydride-containing discharge gas by comprising a zeolite added to a solid metal hydroxide, solid metal carbonate, solid basic metal carbonate or a mixture of these compounds, thereby completing the present invention.

That is, the present invention is as follows:
(1) A detoxifying agent of a metal hydride-containing discharge gas, characterized by comprising a zeolite added to a solid basic metal carbonate, solid metal oxide, solid metal hydroxide, solid metal carbonate or a mixture of these compounds.
(2) The detoxifying agent of a metal hydride-containing discharge gas, characterized in that the metal component of the solid basic metal carbonate, solid metal oxide, solid metal hydroxide, solid metal carbonate or mixture of these compounds is selected from copper, iron, cobalt, nickel, manganese, zinc and chromium.
(3) The detoxifying agent of a metal hydride-containing discharge gas, characterized by comprising the zeolite in an amount of 10 to 90% by weight based on the total weight of the detoxifying agent.
(4) The detoxifying agent of a metal hydride-containing discharge gas, characterized in that the zeolite is added in a precipitate produced by a neutralization reaction between a metal salt which is a precursor of the solid basic metal carbonate, solid metal oxide, solid metal hydroxide, solid metal carbonate or mixture of these compounds and an alkaline compound, or the zeolite is added to a metal powder composed of the solid basic metal carbonate, solid metal oxide, solid metal hydroxide, solid metal carbonate or mixture thereof and then kneaded, and thereafter said detoxifying agent is molded.
(5) A method of detoxifying a metal hydride-containing discharge gas, characterized by bringing a metal hydride-containing discharge gas into contact with the detoxifying agent according to the above-described (1) to (4).

Effects of the Invention

The detoxifying agent according to the present invention is applied in detoxification of a variety of metal hydride-containing discharge gases generated at a semiconductor manufacturing factory, liquid crystal manufacturing factory or the like, such as silane, phosphine and arsine. Since the detoxifying agent can efficiently absorb a metal hydride gas and has a high absorption capacity, its operational usefulness is high. In particular, in the present invention, by combining a zeolite with a solid metal oxide, solid metal hydroxide, solid metal carbonate, solid basic metal carbonate or a mixture of these compounds and by combining physical absorption and chemical reactions utilizing the porosity and high surface area of the zeolite, the detoxifying agent became able to exhibit high detoxifying capacity even at a higher metal hydride concentration and have an increased absorption capacity.

BEST MODE FOR CARRYING OUT THE INVENTION

The present invention relates to a detoxifying agent in which a zeolite is added to a solid metal oxide, solid metal hydroxide, solid metal carbonate, solid basic metal carbonate or a mixture of these compounds. Here, as the metal compound which serves as the main component of the detoxifying agent, any solid metal oxide, solid metal hydroxide, solid metal carbonate, solid basic metal carbonate or mixture thereof may be employed as long as it can stably exist; however, usually, copper, iron, cobalt, nickel, manganese, zinc or chromium, which are easily available and inexpensive, is advantageously used.

As the solid metal compound, an oxide, hydroxide, carbonate or basic carbonate can be used, and it may also be produced by preparing a solution of a metal salt, which is a precursor of the solid metal compound, and then allowing this solution to go under a neutralization reaction with an aqueous solution of an alkaline compound. As the alkaline compound, for example, a hydroxide or carbonate of sodium or potassium, aqueous ammonia or urea is preferably used. A precipitate obtained by the neutralization reaction is washed with water and then filtered out and dried.

Here, the solid metal compound may be used not only as an individual compound, but also as a mixture, produced by a precipitation method. In the case of a compound produced by a precipitation method, when it is used as a mixture, the mixture may be prepared by precipitating the compound individually; however, it is more preferred to obtain a precipitate containing a plurality of components by a co-precipitation method.

Zeolites contain $SiO_2$ and $Al_2O_3$ and in terms of the chemical composition, they are aluminosilicates containing an alkaline metal, alkaline earth metal or other metal. Zeolites have a structure in which tetrahedral structures of $SiO_4$ or $AlO_4$ having Si or Al in the center are three-dimensionally and regularly arranged. Since the tetrahedral structures of $AlO_4$ are negatively charged, zeolites retain cations of alkaline metal or the like in their pores and cavities. The cations can be easily exchanged with other cations such as proton.

There are a number of zeolite types that are classified based on their crystal structures, and the type of the zeolite to be added to the solid metal compound used in the present invention is not particularly restricted. For example, the zeolite may be any synthetic or natural zeolite, such as a Y-type zeolite (FAU), MFI-type zeolite, mordenite-type zeolite, beta-type zeolite (BEA), A-type zeolite, X-type zeolite or L-type zeolite. Further, the ratio, $SiO_2/Al_2O_3$, in the zeolite is also not restricted; however, it is preferably in the range of 3 to 150, especially preferably 3 to 50. In addition, the specific surface area of the zeolite is preferably not smaller than 100 $m^2/g$, more preferably not smaller than 400 $m^2/g$.

In terms of the metal amount based on the total weight of the detoxifying agent, the zeolite content is in the range of 10% by weight to 90% by weight, preferably 10 to 50% by weight. A content of not greater than 10% by mass results in an insufficient improvement in the metal hydride detoxifying capacity, while when the content is not less than 90% by weight, the treatment capacity-improving effect by a reduction in active metal can no longer be recognized.

These zeolites can be produced in accordance with a known method, and a proton-type zeolite can be obtained by, after separating a product obtained by hydrothermal synthesis using a raw material mixture containing a silica source such as silica, silica sol or sodium silicate, an alumina source such as alumina gel, alumina sol or sodium aluminate, an alkali source such as sodium hydroxide or sodium silicate, water and as required, an organic base such as amine, washing the product with water and then drying it, followed by subjecting the resultant to ion-exchange. For instance, an alkaline metal-type zeolite prepared by the above-described hydrothermal synthesis can made into an ammonium-type zeolite by treating it with an aqueous solution of ammonium chloride, ammonium nitrate or the like, and then the thus obtained ammonium-type zeolite can be calcinated in the temperature range of about 400 to 700° C. to obtain a proton-type zeolite.

As the solid metal compound to which the zeolite is added, a powder-form solid metal compound or a molded product thereof, or a granulate obtained by pulverizing the molded product, is used. In the same manner, also in the case of a solid metal compound produced by a precipitation method, a powder solid metal compound or a molded product thereof obtained by extrusion or tableting after kneading with a powder-form metal compound precursor, or a product of pulverization after the molding process, is used.

As a method of producing the detoxifying agent by adding a zeolite to such metal compound, a detoxifying agent is ultimately produced by adding the zeolite during neutralization reaction between an aqueous solution of a metal salt, which is a precursor of the metal compound, and an alkali compound to obtain a precipitate, and filtering out and drying the precipitate; or by adding the zeolite to the metal compound, physically kneading the resulting mixture, subsequently obtaining a mold by extrusion or tableting, and then further drying or calcinating the thus extruded or tableted mold. The temperature of the drying or calcination step is not particularly restricted; however, it is preferably 80° C. to 200° C.

Further, the shape of the detoxifying agent to be produced is also not particularly restricted. In order to ensure sufficient mechanical strength to withstand usage, silica, alumina, magnesia or other inorganic binder which effectively improves the strength may be added as required.

The detoxifying agent obtained by adding the zeolite to a solid metal hydroxide, solid metal carbonate, solid basic metal carbonate or mixture of these compounds is, when actually used, filled in a flow-type loading column and then brought into contact with a metal hydride-containing discharge gas to detoxify metal hydride gas.

Examples of the metal hydride gas which can be detoxified by the detoxifying agent according to the invention include silane, arsine, phosphine, disilane, diborane, hydrogen selenide, germane and dichlorsilane.

The present inventors loaded the detoxifying agent obtained by a series of those procedures to a stainless flow-type reactor and allowed a reducing gas containing silane, phosphine and germane to flow therein as metal hydride gases to carry out the tests to determine the metal hydride-containing gas detoxifying performance at normal temperature by measuring and monitoring the amount of the metal hydride gases leaked into the outlet gas using a break monitor (manufactured by Bionics Co., Ltd.).

As a result, the present inventors confirmed that the detoxifying agent according to the present invention has superior detoxifying capacity (L/kg) as compared to a solid metal oxide-based, solid metal hydroxide-based, solid metal carbonate-based, and solid basic metal carbonate-based treatment agents which do not contain a zeolite, and that the metal hydrides were not detected in the outlet gas for a prolonged period of time, thereby completing the present invention.

That is, because of the effective physical absorption and chemical reactions that are generated by the combination of the zeolite having porosity and high surface area and a solid metal oxide, solid metal hydroxide, solid metal carbonate, solid basic metal carbonate or mixture of these compounds, the detoxifying agent according to the invention can exhibit much higher detoxifying capacity for a prolonged period of time as compared to those conventional ones. The detoxifying agent demonstrates very high detoxifying capacity even at a high concentration (% order) of metal hydride gases.

EXAMPLE

The present invention will now be explained in more detail by way of examples. Here, the performance evaluation of the detoxifying agent according to the present invention was carried out by measuring the performance thereof to detoxify a metal hydride gas contained in a nitrogen gas. The measurement was carried out by using an atmospheric pressure flow reactor, and the reactor, conditions and operational method were as follows.

(The Apparatus for Measuring the Metal Hydride Gas Detoxifying Performance and the Measurement Conditions)

Apparatus for measuring detoxifying performance: atmospheric pressure flow reactor Size of reaction tube: inner diameter=28 mm, length=700 mm Measurement conditions Amount of detoxifying agent used: 60 cc (loading height=100 mm)

GHSV: 300 hr$^{-1}$

Pressure: atmospheric pressure

Reaction temperature: normal temperature

Reaction gas composition: $SiH_4$ (silane) 1%

$N_2$ balance (Operational Method of the Apparatus for Measuring the Metal Hydride Gas Detoxifying Performance and Calculation Method of the Detoxifying Performance)

Into a reaction tube, 60 cc of detoxifying agent is filled to a loading height of 100 mm, and the loaded reaction tube is installed in the measuring apparatus. Then, a metal hydride gas diluted with nitrogen is allowed to flow in the detoxifying agent-loaded layer. After the gas starts to flow, leakage of the metal hydride gas into the outlet gas from the reaction tube is measured and monitored using a break monitor (manufactured by Nihon Bionics Co., Ltd.). The cumulative amount of the silane inflow until the outlet concentration thereof reached 5 ppm is determined and converted to an amount thereof per 1 kg of the treatment agent. Specifically, the metal hydride gas detoxifying performance is calculated from the measurement results by the following equation.

(Method of Calculating the Metal Hydride Gas Detoxifying Performance of the Treatment Agent)

$$\text{Detoxifying performance (L/kg)} = A \times B/100) \times (C/E)$$

wherein, A: measured gas flow (L/min);

B: concentration of the metal hydride gas (% by volume);

C: cumulative time of the gas flow until the outlet concentration of the metal hydride gas reached a prescribed concentration (min); and E: amount of the loaded treatment agent (kg)

Example 1

To an aqueous copper sulfate solution, a Y-type zeolite was added in an amount of 50% by weight based on the amount of an oxide product to be obtained by neutralization reaction to prepare an aqueous copper sulfate/zeolite solution. This aqueous solution was allowed to go under a neutralization reaction with concurrently prepared sodium carbonate to obtain a basic copper carbonate precipitate. Then, after sufficiently removing impurities by washing with water, the precipitate was filtered out and dried at 110° C. to obtain basic copper carbonate/zeolite. In a kneader, 120 g of pure water was added to 200 g of the thus obtained basic copper carbonate/zeolite, and the resultant was sufficiently mixed. Then, the resulting mixture was extrusion molded into a size of 3 mm in diameter, and the thus obtained mold was dried at 110° C. and filled in the reaction tube. The evaluation results of the silane detoxifying performance of the detoxifying agent prepared in this manner are shown in Table 1.

Example 2

Using a commercially-available basic copper carbonate as the metal compound, in a kneader, 100 g of pure water was added to 160 g of the basic copper carbonate and 40 g of a Y-type zeolite, and the resultant was sufficiently mixed. Then the resulting mixture was extrusion molded into a size of 3 mm in diameter, and the thus obtained mold was dried at 110° C. and filled in the reaction tube. The evaluation results of the silane detoxifying performance of the detoxifying agent prepared in this manner are shown in Table 1.

Example 3

A detoxifying agent was prepared in the same manner as in Example 2, except that the Y-type zeolite was added in an amount of 50% by weight. The evaluation results thereof are shown in Table 1.

Example 4

A detoxifying agent was prepared in the same manner as in Example 2, except that the Y-type zeolite was added in an amount of 80% by weight. The evaluation results thereof are shown in Table 1.

Example 5

A detoxifying agent was prepared in the same manner as in Example 2, except that the type of the added zeolite was BEA25. The evaluation results thereof are shown in Table 1.

Example 6

A detoxifying agent was prepared in the same manner as in Example 2, except that the type of the added zeolite was BEA150. The evaluation results thereof are shown in Table 1.

Example 7

A detoxifying agent was prepared in the same manner as in Example 2, except that the type of the added zeolite was MOR20. The evaluation results thereof are shown in Table 1.

Example 8

A detoxifying agent was prepared in the same manner as in Example 2, except that the type of the added zeolite was MFI27 (proton-type). The evaluation results thereof are shown in Table 1.

Example 9

A detoxifying agent was prepared in the same manner as in Example 2, except that the type of the added zeolite was MFI27 (ammonium-type). The evaluation results thereof are shown in Table 1.

Example 10

By a neutralization reaction between an aqueous solution obtained by dissolving 280 g of copper sulfate and 160 g of zinc sulfate in 0.8 L of pure water and an aqueous alkali solution obtained by dissolving 240 g of the concurrently prepared sodium carbonate in 3 L of pure water, a complex compound of copper and zinc was obtained as a precipitate. Then, after sufficiently removing impurities by washing with water, the precipitate was filtered out, dried at 120° C. and calcinated at 300° C. to obtain copper oxide and zinc oxide. A detoxifying agent was prepared in the same manner as in Example 3, except that a complex oxide of the thus obtained copper oxide and zinc oxide was used. The evaluation results thereof are shown in Table 1.

Example 11

By a neutralization reaction between an aqueous solution obtained by dissolving 480 g of iron sulfate and 160 g of manganese sulfate in 2 L of pure water and an aqueous alkali solution obtained by dissolving 350 g of the concurrently prepared sodium carbonate in 1.7 L of pure water, a complex compound of iron and manganese was obtained as a precipitate. Then, after sufficiently removing impurities by washing with water, the precipitate was filtered out, dried at 120° C. and calcinated at 500° C. to obtain iron oxide and manganese oxide. A detoxifying agent was prepared in the same manner as in Example 3, except that a complex oxide of the thus obtained iron oxide and manganese oxide was used. The evaluation results thereof are shown in Table 1.

Comparative Example 1

The experiment was carried out in the same manner as in Example 1, except that the zeolite was not added. The results thereof are shown in Table 1.

Comparative Example 2

A Y-type zeolite was added to a commercially-available boehmite and in a kneader, 2 g of acetic acid and 160 g of pure water were added to 200 g of the thus obtained boehmite/zeolite and the resultant was sufficiently mixed. Then, the resulting mixture was molded into a size of 3 mm in diameter, and the thus obtained mold was dried at 110° C. and filled in the reaction tube. The evaluation results of the performance of the detoxifying agent prepared in this manner are shown in Table 1.

Comparative Example 3

The experiment was carried out in the same manner as in Example 10, except that the zeolite was not added. The results thereof are shown in Table 1.

Comparative Example 4

The experiment was carried out in the same manner as in Example 11, except that the zeolite was not added. The results thereof are shown in Table 1.

[Table 1]

TABLE 1

Performance test results of detoxifying agents of metal hydride-containing discharge gas

| | | | |
|---|---|---|---|
| Example 1 | Basic copper carbonate + 50% Y-type zeolite | 35 L/L | 46 L/Kg |
| Example 2 | Basic copper carbonate + 20% Y-type zeolite | 38 L/L | 42 L/Kg |
| Example 3 | Basic copper carbonate + 50% Y-type zeolite | 38 L/L | 52 L/Kg |
| Example 4 | Basic copper carbonate + 80% Y-type zeolite | 26 L/L | 44 L/Kg |
| Example 5 | Basic copper carbonate + 50% BEA 25 | 30 L/L | 49 L/Kg |
| Example 6 | Basic copper carbonate + 50% BEA 150 | 26 L/L | 39 L/Kg |
| Example 7 | Basic copper carbonate + 50% MOR 20 | 26 L/L | 33 L/Kg |
| Example 8 | Basic copper carbonate + 50% MFI 27 (proton-type) | 33 L/L | 40 L/Kg |
| Example 9 | Basic copper carbonate + 50% MFI 27 (ammonium-type) | 28 L/L | 33 L/Kg |
| Example 10 | Copper oxide + Manganese oxide + 50% Y-type zeolite | 11 L/L | 15 L/Kg |
| Example 11 | Manganese oxide + Iron oxide + 50% Y-type zeolite | 6 L/L | 8 L/Kg |
| Comparative Example 1 | Basic copper carbonate | 19 L/L | 28 L/Kg |
| Comparative Example 2 | 30% Alumina + 70% Y-type zeolite | 1 L/L | 1 L/Kg |
| Comparative Example 3 | Copper oxide + Manganese oxide | 10 L/L | 10 L/Kg |
| Comparative Example 4 | Manganese oxide + Iron oxide | 4 L/L | 4 L/Kg |

According to the results shown in Table 1, in Examples 1 to 9 where a zeolite was added to an active component, basic copper carbonate, the metal hydride gas detoxifying performance was markedly higher as compared to Comparative Example 1 where no zeolite was added to the same active component.

In addition, in Examples 10 and 11 where a zeolite was added to an active component, metal oxide mixture, the metal hydride gas detoxifying performance was markedly higher as compared to Comparative Examples 3 and 4 where no zeolite was added to the same metal oxide mixture. In Examples 10 and 11, the detoxifying performance was slightly inferior as compared to Examples 1 to 9 and Comparative Example 1 where a different active component, basic copper carbonate, was used, and although it is difficult to compare the detoxifying capacities when the active components are different, in those cases where a zeolite was added to the same active component, it was shown that the detoxifying performance is drastically improved by an addition of a zeolite.

Furthermore, from the result that the detoxifying capacity was very low in Comparative Example 2 where a zeolite was added to a carrier containing no active component, it was revealed that the metal hydride gas detoxifying performance is drastically improved by combining a variety of zeolites with a metal oxide, metal hydroxide, metal carbonate or basic metal carbonate compound as an active component.

INDUSTRIAL APPLICABILITY

The detoxifying agent according to the present invention can be applied in detoxification of a variety of metal hydride-containing discharge gases generated at a semiconductor manufacturing factory, liquid crystal manufacturing factory or the like, such as silane, phosphine and arsine. The present invention, for the first time, focused attention on combining a zeolite to a solid metal oxide, solid metal hydroxide, solid metal carbonate, solid basic metal carbonate or mixture of these compounds. By combining physical absorption and chemical reactions utilizing the porosity and high surface area of a zeolite, the detoxifying agent according to the present invention can exhibit a high detoxifying capacity even at a high concentration of metal hydride and efficiently absorb metal hydride gases with a large absorption capacity; therefore, the detoxifying agent according to the present invention has high operational usefulness.

The invention claimed is:

1. A method of detoxifying a metal hydride-containing discharge gas, comprising:

providing a detoxifying agent comprising a zeolite that has been added to a solid basic metal carbonate, solid metal oxide, solid metal hydroxide, solid metal carbonate, or mixture thereof, wherein said zeolite is in an amount from 10 to 90% by weight based on the total weight of said detoxifying agent; and bringing a metal hydride-containing discharge gas into contact with the detoxifying agent.

2. The method of detoxifying a metal hydride-containing discharge gas, of claim 1, wherein said zeolite is in an amount from 10 to 50% by weight based on the total weight of said detoxifying agent.

3. The method of detoxifying a metal hydride-containing discharge gas of claim 1, wherein the detoxifying agent which is used comprises said zeolite in an amount from 10 to 50% by weight based on the total weight of said detoxifying agent.

4. The method of detoxifying a metal hydride-containing discharge gas of claim 1, wherein the detoxifying agent which is used comprises said zeolite added to a metal powder composed of said solid basic metal carbonate, solid metal oxide, solid metal hydroxide, solid metal carbonate, or mixture thereof and then kneaded, and thereafter said detoxifying agent is molded.

5. The method of detoxifying a metal hydride-containing discharge gas of claim 1, wherein the detoxifying agent which is used comprises said zeolite added in a precipitate produced by a neutralization reaction between a metal salt which is a precursor of said solid basic metal carbonate, solid metal oxide, solid metal hydroxide, solid metal carbonate, or mixture thereof, and an alkaline compound.

\* \* \* \* \*